(12) United States Patent  (10) Patent No.: US 9,131,796 B2
Holt  (45) Date of Patent: Sep. 15, 2015

(54) CORN CREAMER

(76) Inventor: Cecil Holt, Douglas, GA (US)

( * ) Notice: Subject to any disclaimer, the term of this patent is extended or adjusted under 35 U.S.C. 154(b) by 332 days.

(21) Appl. No.: 13/532,710

(22) Filed: Jun. 25, 2012

(65) Prior Publication Data

US 2012/0325096 A1  Dec. 27, 2012

Related U.S. Application Data

(60) Provisional application No. 61/500,134, filed on Jun. 23, 2011.

(51) Int. Cl.
*A47J 17/16* (2006.01)

(52) U.S. Cl.
CPC ........................................ *A47J 17/16* (2013.01)

(58) Field of Classification Search
CPC .......... A01F 11/06; A47J 17/16; A23N 15/02
USPC ..................... 99/567–642; 460/17–20, 25–28, 460/123–135
See application file for complete search history.

(56) References Cited

U.S. PATENT DOCUMENTS

| 240,052 | A | * | 4/1881 | Stover | 460/54 |
| 1,127,548 | A | * | 2/1915 | Turner | 460/17 |
| 6,305,276 | B1 | * | 10/2001 | Backus | 99/514 |

* cited by examiner

*Primary Examiner* — Tu B Hoang
*Assistant Examiner* — Thomas Ward
(74) *Attorney, Agent, or Firm* — Brian D. Bellamy

(57) ABSTRACT

A corn creamer includes a blade bit with a cylindrical body having a first circular end and a second circular end, and said cylindrical body and circular ends define an interior chamber with an interior circumference defined by an interior surface of the circular ends and the cylindrical body. Teeth are disposed on the first circular end of said blade bit, and a scraping blade member with a cutting edge is attached to said cylindrical body and said cutting edge extends inward from the cylindrical body partially into the interior chamber. The second circular end of the blade bit is attached to a shaft and the device is used to cut and cream corn.

22 Claims, 8 Drawing Sheets

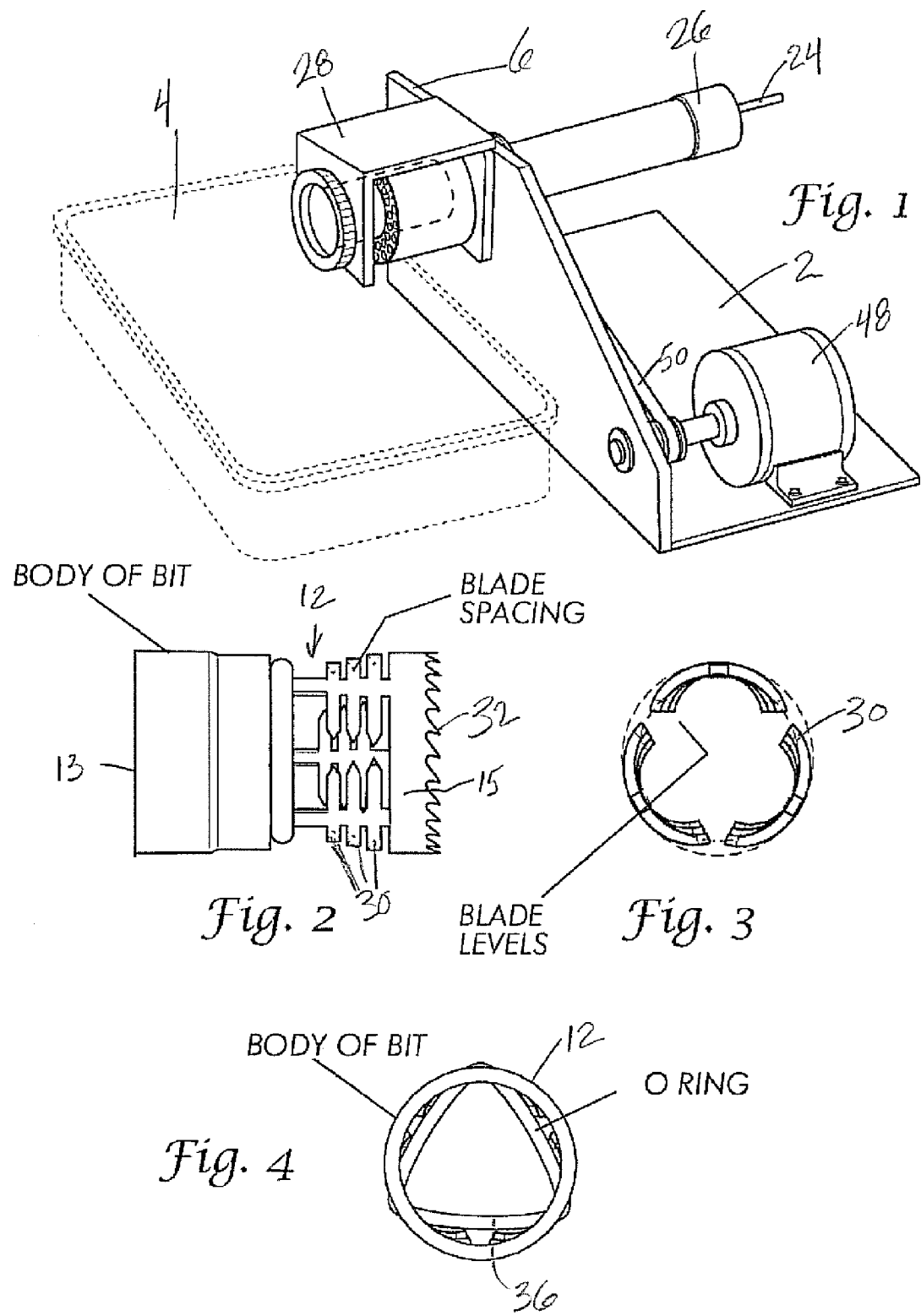

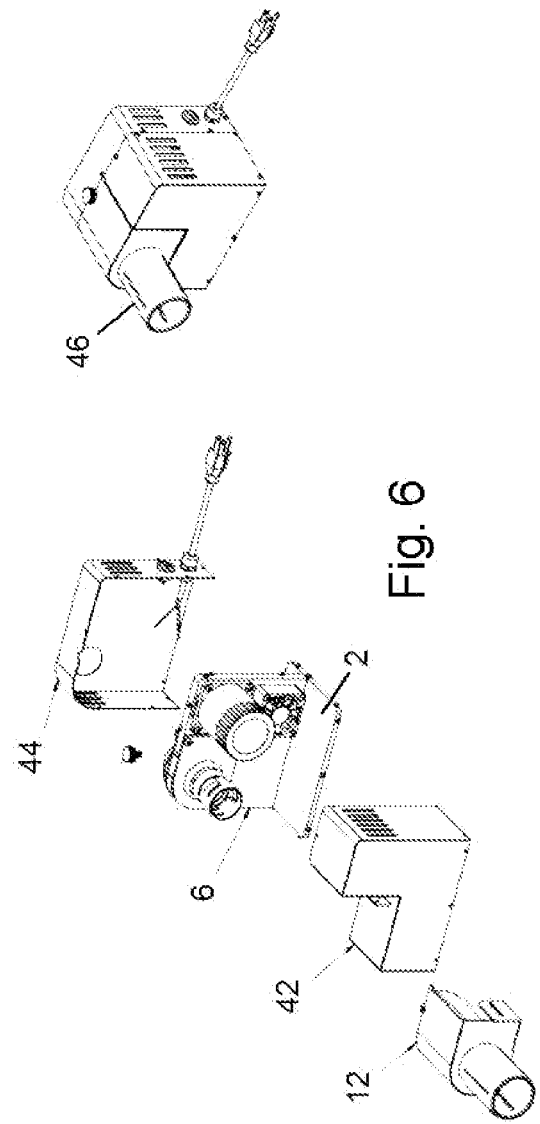

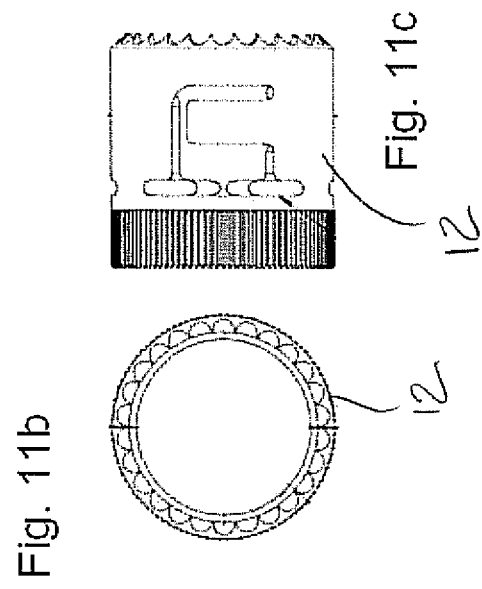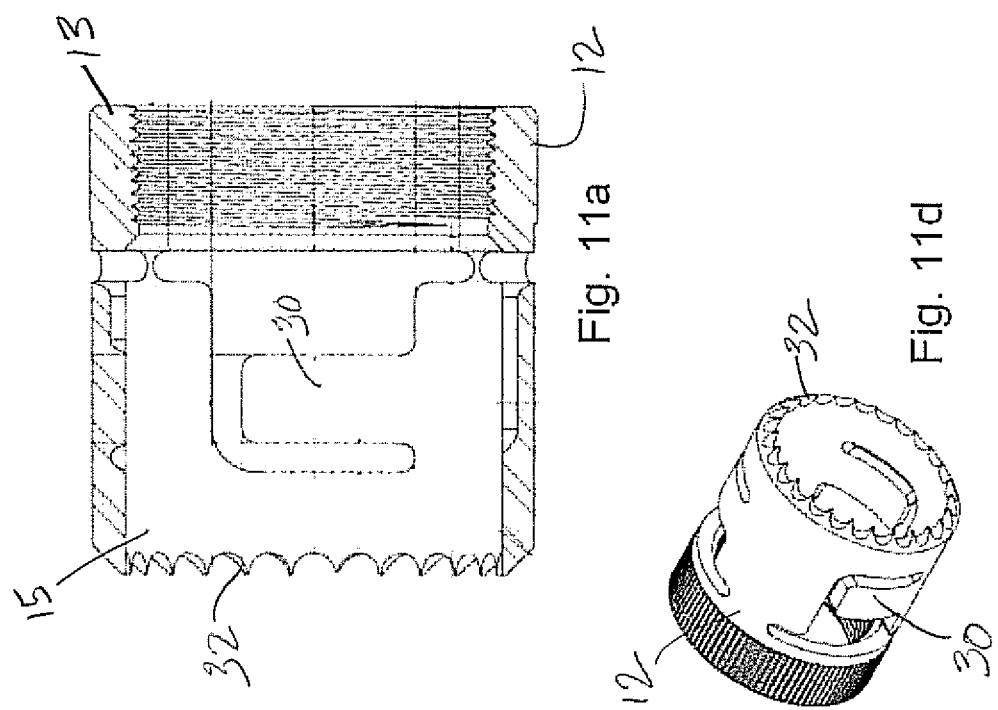

CORN CREAMER

PRIORITY CLAIM

This application claims benefit of U.S. Provisional Application No. 61/500,134 filed on Jun. 23, 2011.

BACKGROUND OF THE INVENTION

A. Field of the Invention

The present invention relates to an apparatus for creaming corn found on cobs. The particular device relates to a small portable corn creamer useful for creaming single ears of corn using a rotating cylindrical blade.

B. Discussion of the Prior Art

Various attempts have been made to cream corn easier. These include complex industrial machinery and small scraping tools for removal of corn from cobs. Nonetheless, a need persists for an improved corn creamer with the advantages of the present invention.

SUMMARY OF THE INVENTION

The present invention provides a corn creamer that cuts and scraps corn simultaneously to quickly and effective cream corn cobs of several sizes. The apparatus has a small cylindrical blade bit connected to a shaft for rotation. The cylindrical body of the bit receives an ear of corn within an interior chamber. As the corn enters, the blade teeth on the first end of the bit cuts the corn from the cob. Thereafter, within the chamber, the scraping blade extending inward into the chamber scrapes the remainder of corn from the cob.

The corn creamer is enhanced by a blade shield and cover to prevent injury. The shaft and blade are motorized to reduce labor, and a plunger rod is provided to quickly remove corn cobs for insertion of additional cobs sequentially. A compression ring within the chamber of the blade operates to press all of the juice from the cob for maximum efficiency of creaming.

These and other objects and advantages of the invention will be apparent to those skilled in the art based on the detailed description and the drawings.

BRIEF DESCRIPTION OF THE DRAWINGS

FIG. 1 is a perspective view of a corn creamer apparatus in accordance with an embodiment of the invention.

FIG. 2 is a side plan view of a blade bit.

FIG. 3 is an end view of one embodiment of scraping blades in accordance with the invention.

FIG. 4 is an end view of a blade bit.

FIG. 6 is an assembly view of a corn creamer apparatus in an embodiment without a portion of the body.

FIG. 11a is a side cut-away view of a blade bit.

FIG. 11b is an end view of a blade bit.

FIG. 11c is a side view of a blade bit.

FIG. 11d is a perspective view of a blade bit.

DETAILED DESCRIPTION OF THE INVENTION

Figure 8:
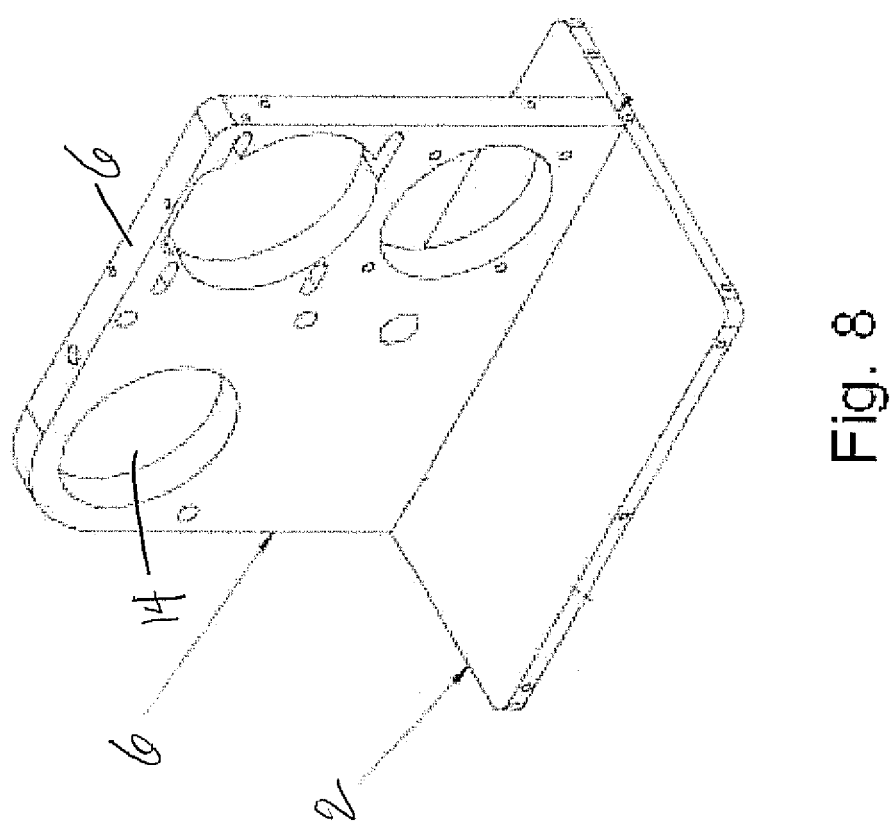
FIG. 8 is a perspective view of a frame base plate and frame mount plate for an embodiment of the invention.
Figure 9A:
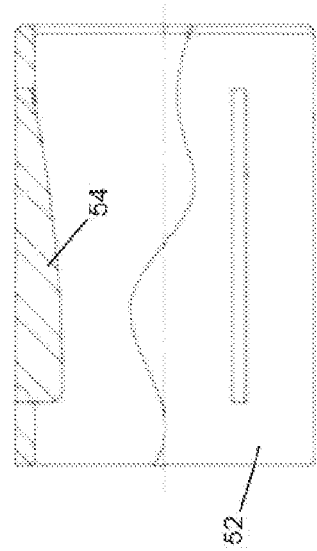
FIG. 9a is an end view of a feed tube with fin.
Figure 9B:
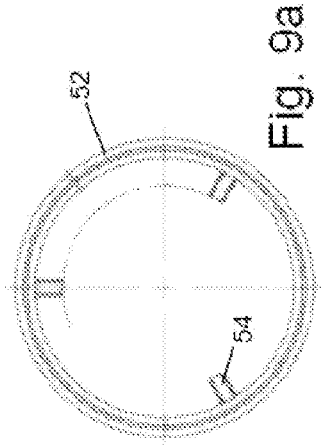
FIG. 9b is a side view of a feed tube and feed tube fin.
Figure 9C:
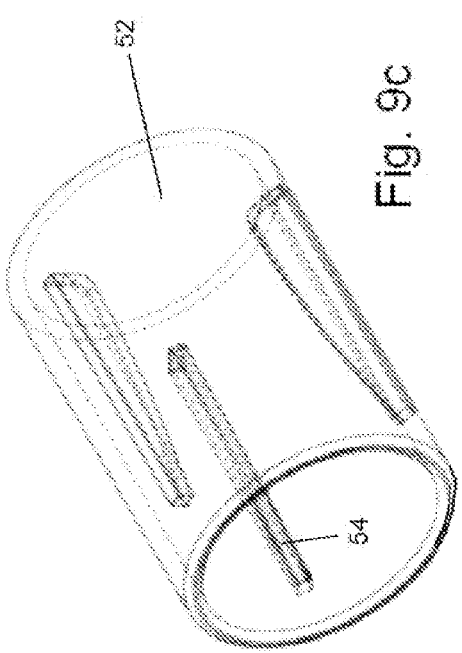
FIG. 9c is a perspective view of a feed tube with fin.
Figure 10B:
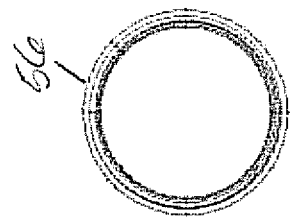
FIG. 10b is an end view of a chuck tube.
Figure 10A:
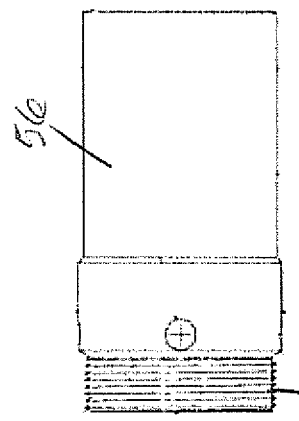
FIG. 10a is a side view of a chuck tube.
Figure 10C:
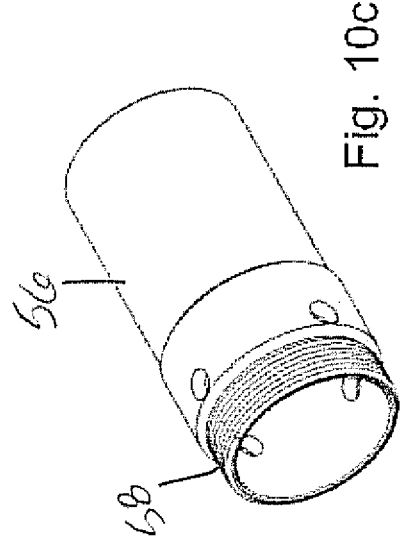
FIG. 10c is a perspective view of a chuck tube.

Referring now to the drawings, FIGS. 1-5 illustrate a first embodiment showing a stationary base 2 that may be attached to a frame or table 4 (base members) or set onto a platform that supports it or a base. A block 6 is provided and includes a bearing 8 situated within the block. The block and base are further illustrated in FIG. 8. The bearing is 3/8" thick, and a shaft 10 passes through the bearing. An o-ring may be situated on the shaft of tubing/cylinder and may rest against the bearing. Furthermore, the bearing may rest against an indentation on the metal cylinder shaft 10. An alternative embodiment of the cylindrical shaft. FIGS. 10a-10c illustrates a chuck tube 56 for insertion into a block 6 and bearing 8. The chuck tube 56 shown in FIGS. 10a-10c has a threaded collar 58 for receiving the blade bit 12. The tube in FIGS. 10a-10c further includes a raised edge about the circumference of the cylinder on the end where the blade bit is attached for retention of the chuck tube against the receiving member of the block 6 and bearing 8.

A blade bit 12 having a cylindrical body is provided for cutting corn and has a first circular end 15 and a second circular end 13. The second circular end 13 includes a threaded circumference for receiving a threaded end of a cylindrical shaft 10 or chuck tube 56. The circular ends of the blade bit 12 define an interior chamber with an interior circumference defined by an interior surface of the circular ends 13, 15 and the cylindrical body of the blade bit. The first circular end 15 may include teeth 32 for creaming corn. The teeth on the first circular end of the blade bit are outward disposed like a circular saw blade on the entire periphery of the first circular end for cutting the corn off the cob and creaming the corn.

Embodiments of the blade bit are shown in FIGS. 2-4 and FIGS. 11a-11d. The shaft/cylinder 10 is pressed into a bearing hole 14, see FIG. 8, in the block 6 that retains the bearing 8. The blade bit 12 and the cylinder shaft 10 both include a hole defined by the circumference of the shaft and the blade bit that is large enough to accommodate a corn cob. The blade bit is attached to the metal cylinder shaft such that the shaft and blade come apart. The blade bit screws onto the metal shaft. The blade bit may be interchangeable and one could use 2 heads to interchange for different size corn, therefore a person could use the device for extremely small ears of corn.

A ridge inside of the blade cylinder shaft 10 portion of the device prevents cut corn material from moving backward toward and into the bearing 8. Meanwhile, holes that are cut out of the cylindrical body of the blade bit 12 allow juice from the corn cob and corn fragments to fall through the blade bit and into a pan or collection container. The blade bit 12 forms a tube shaped member that rotates counter-clockwise to cut the corn off the cob and cream the corn as the device operates.

Figure 5:
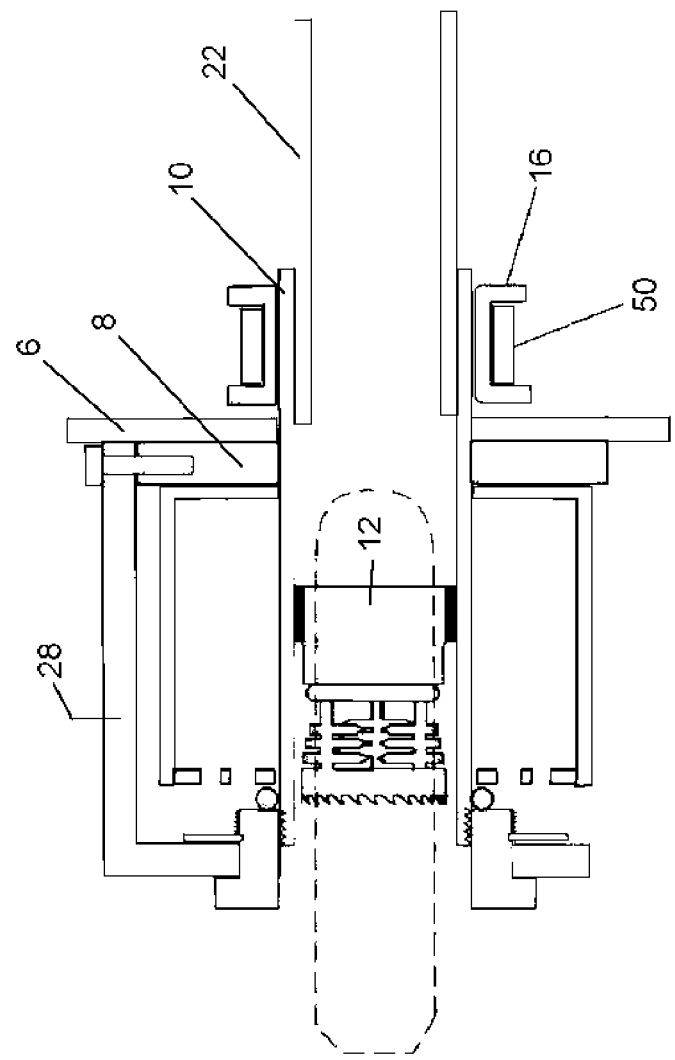
FIG. 5 is a cut-away side view of the corn creamer apparatus in one embodiment.
Figure 7B:
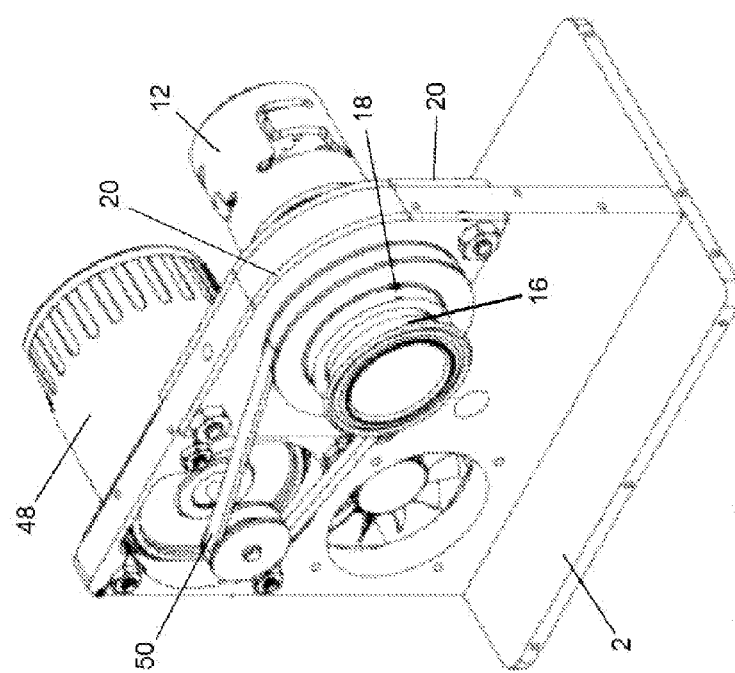
FIG. 7b is a perspective view of an opposing side of FIG. 7a of a blade bit and pulley drive assembly with a portion of the body of the apparatus shown.
Figure 7A:
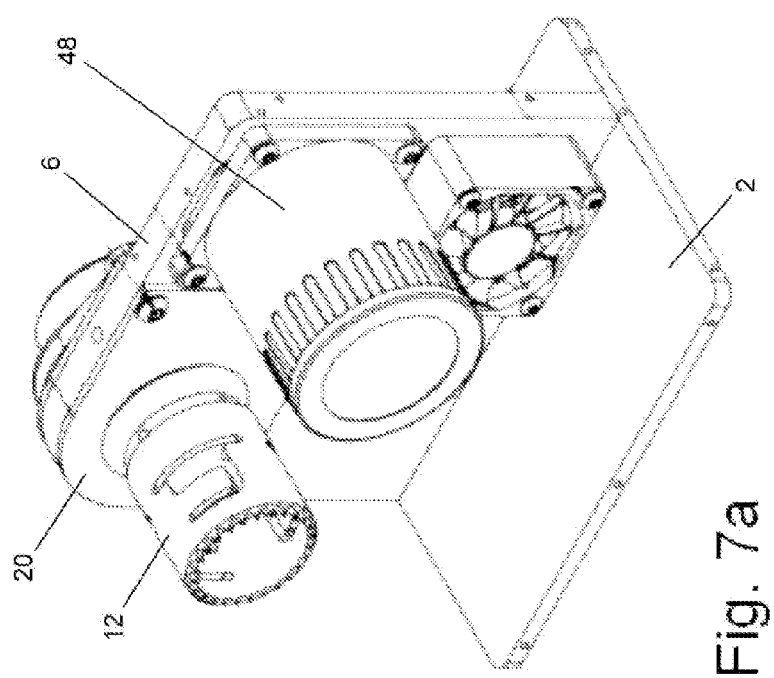
FIG. 7a is a perspective view of a blade bit and pulley drive assembly with a portion of the body of the apparatus shown.

A pulley 16 is anchored on a part of the cylinder shaft 10 on the device behind the blade bit 12 and on the opposing side of the block 6. For instance, the pulley pulls may be anchored by set screw 18 behind block as shown in FIG. 7b. The metal cylinder shaft 10 is attached to the block by the combination of pressing the shaft 10 into block 6 and all the way through block. An o-ring on the metal shaft 10 forward of where pulley 16 attaches fits into the block and seals on the opposing side of block to keep corn fragments and juice from entering the bearing within the block. The bearing may be retained within the block by bearing plates 20 as shown in FIGS. 7a and 7b. The o-ring may be retained by the edge of the blade bit 12.

An enlarge opening is provided on one end of the metal cylinder shaft 10 for a sleeve 22 to slide into about 1 inch. Thereby, a ridge is formed about 1 inch from the end within the cylinder for retaining the sleeve. The sleeve fits securely within the end of the shaft, but can be removed by pulling and sliding out. A punch 24 is provided for to remove a corn cob from the cylinder shaft 10 after corn has been cut. The punch 24 is situated within the sleeve 22 for pushing the punch inward through the sleeve if needed to eject a cob. A round ball or retainer may be attached to the end of punch within the sleeve to keep the punch from sliding out of the sleeve. A cap 26 slides over the opposing end of the sleeve from the cylinder shaft and attaches to the sleeve. The cap has a hole for the punch shaft rod to slide through. A punch shaft rod portion of the punch 24 is hollow to provide an air vent.

A shield is provided for through attachment to the block 6. The shield cover may fit over the metal cylinder shaft and the blade bit, and attach to the block 6 by an appendage. The shield may use a lock nut and screw to attach, and thereby provide a arch over the blade area and a portion of the metal shaft to prevent corn material from spilling upwards. Further, the shield deflects any corn material downward and protects a person from getting clothing or limbs into the area of the rotating shaft and blade bit.

A blade cover member of the shield is provided. The blade cover may attach to block with the angle iron 28 that bolts onto the top of block 6 (screws onto the top of the block that the bearing is mounted in). The angle iron bends downward to support a collar within the downward portion of the angle iron. The downward portion includes a hole with the collar attached within the hole to provide a shield and guide for the blade that turns inside of the collar. If an ear of corn gets away then one can stop the machine and use the plunger 24 to push the ear back out if stuck. Another embodiment of a blade cover 40 is shown in the embodiment of FIG. 6 that attached to a first housing 42 and second housing 44 mounted on the base 2. Guard 46 protects against injury as corn is placed into the device and received by the blade bit 12 covered by the housing and blade cover 40. As an alternative to a blade cover, the device may include a funnel type cover that may attach to the cylinder of the blade with the outer teeth of the blade exposed within the skirt of the funnel. The funnel type cover is useful for a hand-held model where blade is stationary and corn is rotated.

The embodiment shown in FIGS. 7a and 7b operated by an electric motor 48, which operates the pulley 16 via a belt 50. An alternative hand-held model may be provided with or without the interior layers of teeth 30. Further, a slot for juices to escape may be included. It is possible to separate the slot for inserting a finger through the cylinder wall to press against the cob and remove juice from the cob by pressing. Another alternative is provided in which the blade is stationary and the cob is attached to rotating element or rotated by hand and inserted into the blade.

Cob handling may include an additional pointed device used to handle the ear by sticking the ear onto the point and using the handle of the device to control the ear, push it into the teeth of the blade bit 12, then pull the ear back out. This can be used for handling the device to control corn, or a person can insert corn by hand. Alternatively, one could remove the pvc tube and plunger 24 and let corn go all the way through the blade.

There are different types of cutting provided by the device. First, outer cut teeth 32 act to cut the outer surface of the corn cob. Second, inner scraping members 30 are provided that impinge inward into the blade bit interior chamber. As the blade bit rotates, the inner scraping members 30 scrub the cob and pull the grain off. The scraping members may be fins or may be one wide piece or several narrow pieces. The scraping members may include several teeth with the teeth turned down gradually. For instance, a first member may be turned down the least, then additional members behind the first turned downward more. Thereby, the device may include 2-3 or more gradual scraping cuts for creaming corn. The device includes an embodiment in which the rotation of cutting edge of scraping blade member has a smaller circumference than the interior circumference of the hollow interior cylinder shaft 10.

A juice squeezing ring 36 presses any remaining milk from the cob. The triangular o-ring milks the cob and removes juice by pressing on the cob as it is inserted into the blade bit. In other words, the pressing member provides additional creaming capacity over and beyond the scraping members 30 and the blade teeth 32 that juices the cob. The o-ring 36 for juicing is an optional feature.

In another embodiment, a feed tube 52 is attached to the cylinder shaft. Several fins 54 taper from the receiving end of the feed tube toward the opposing end where creamed corn is released. The tapered fins enlarge inward on the cylinder. The height of the fins increases from the inner surface of the cylinder as the fins enlarge. The taper of the fins causes corn to be removed from the cob when placed through the feed tube by scraping and squeezing the corn from the cob.

I claim:

1. An apparatus for making cream style corn comprising:
   a. a blade bit with a cylindrical body having a first circular end and a second circular end, and said cylindrical body and circular ends define an interior chamber with an interior circumference defined by an interior surface of the circular ends and the cylindrical body;
   b. teeth disposed on the first circular end of said blade bit;
   c. a scraping blade member with a cutting edge attached to said cylindrical body and said cutting edge extends inward from the cylindrical body partially into the interior chamber; and
   d. said second circular end of the blade bit attached to a shaft, and a first end of the shaft is threaded and the second circular end of the blade bit is threaded, and the blade bit is removable and replaceable with a smaller blade bit.

2. An apparatus for making cream style corn as in claim 1 in which said teeth are outward disposed like a circular saw blade on the entire periphery of the first circular end.

3. An apparatus for making cream style corn as in claim 1 in which at least one set of at least three of said scraping blade members are included and said cutting edge of each scraping blade member extends inward from the cylindrical body partially into the interior chamber.

4. An apparatus for making cream style corn as in claim 3 in which each of said three scraping blade members of said each set extends progressively further inward from the cylindrical body partially into the interior chamber.

5. An apparatus for making cream style corn as in claim 1 in which said shaft is a cylinder with the blade bit attached to a first end of the cylinder and a punch device attached to a second end of the cylinder.

6. An apparatus for making cream style corn as in claim 5 in which said punch device includes a tubular sleeve and a rod sliding within the tubular sleeve.

7. An apparatus for making cream style corn as in claim 6 in which said second end of the shaft is threaded and the tubular sleeve of punch device includes a first threaded end attached to the shaft and the tubular sleeve includes a second capped end with an aperture for the rod of the punch device.

8. An apparatus for making cream style corn as in claim 7 in which said punch rod includes a retaining member on one end and a knob on the other.

9. An apparatus for making cream style corn as in claim 1 in which said platform provided includes a block attached to and supported on the platform, and the block including a bearing, the shaft passes through the block and is retained by the bearing, and a pulley is attached to the shaft for driving the shaft.

10. An apparatus for making cream style corn as in claim 9 in which said pulley is anchored on the shaft on one side of block and bearing and the blade bit is attached to the shaft on an opposing side of the block and bearing, whereby said shaft is retained in part by a lip of indentation on the shaft with respect to said bearing.

11. An apparatus for making cream style corn as in claim 9 in which said blade bit's interior chamber is large enough to accommodate a corn cob.

12. An apparatus for making cream style corn as in claim 9 in which said blade bit is removable and different sized blade bits accommodate larger or smaller corn cob size.

13. An apparatus for making cream style corn as in claim 9 in which a shield is attached to the block and includes a cover member situated over the blade bit attached to the shaft.

14. An apparatus for making cream style corn as in claim 13 in which the cover member provides an arch over the blade bit to deflect corn material downward and prevent corn material from splattering or spilling upwards or laterally away from the blade bit.

15. An apparatus for making cream style corn as in claim 13 in which said cover member is attached for receiving corn cob and protecting from the blade.

16. An apparatus for making cream style corn as in claim 11 in which holes in the blade bit allow for cream to pass downward into a container.

17. An apparatus for making cream style corn as in claim 11 in which said blade bit includes a triangular o-ring for pressing juice out.

18. An apparatus for making cream style corn as in claim 6 in which said rod on the punch device is hollow for air to escape.

19. An apparatus for making cream style corn comprising:
a blade bit with a cylindrical body having a first circular end and a second circular end, and said cylindrical body and circular ends define an interior chamber with an interior circumference defined by an interior surface of the circular ends and the cylindrical body;
said blade bit is removable and different sized blade bits accommodate larger or smaller corn cob size;
teeth disposed on the first circular end of said blade bit;
a scraping blade member with a cutting edge attached to said cylindrical body and said cutting edge extends inward from the cylindrical body partially into the interior chamber; and
said second circular end of the blade bit attached to a shaft; and
a platform provided includes a block attached to and supported on the platform, and the block including a bearing, the shaft passes through the block and is retained by the bearing, and a pulley is attached to the shaft for driving the shaft.

20. An apparatus for making cream style corn comprising:
a blade bit with a cylindrical body having a first circular end and a second circular end, and said cylindrical body and circular ends define an interior chamber with an interior circumference defined by an interior surface of the circular ends and the cylindrical body;
teeth disposed on the first circular end of said blade bit;
a scraping blade member with a cutting edge attached to said cylindrical body and said cutting edge extends inward from the cylindrical body partially into the interior chamber;
said second circular end of the blade bit attached to a shaft, and said shaft is a cylinder with the blade bit attached to a first end of the cylinder;
a punch device attached to a second end of the cylinder, and said punch device includes a tubular sleeve and a rod sliding within the tubular sleeve; and
said second end of the shaft is threaded and the tubular sleeve of said punch device includes a first threaded end attached to the shaft and the tubular sleeve includes a second capped end with an aperture for the rod.

21. An apparatus for making cream style corn comprising:
a blade bit with a cylindrical body having a first circular end and a second circular end, and said cylindrical body and circular ends define an interior chamber with an interior circumference defined by an interior surface of the circular ends and the cylindrical body, and said interior chamber is large enough to accommodate a corn cob;
teeth disposed on the first circular end of said blade bit;
a scraping blade member with a cutting edge attached to said cylindrical body and said cutting edge extends inward from the cylindrical body partially into the interior chamber;
said second circular end of the blade bit attached to a shaft;
said blade bit includes a triangular o-ring for pressing juice out; and
a platform provided includes a block attached to and supported on the platform, and the block including a bearing, the shaft passes through the block and is retained by the bearing, and a pulley is attached to the shaft for driving the shaft.

22. An apparatus for making cream style corn comprising:
a blade bit with a cylindrical body having a first circular end and a second circular end, and said cylindrical body and circular ends define an interior chamber with an interior circumference defined by an interior surface of the circular ends and the cylindrical body;
teeth disposed on the first circular end of said blade bit;
a scraping blade member with a cutting edge attached to said cylindrical body and said cutting edge extends inward from the cylindrical body partially into the interior chamber;
said second circular end of the blade bit attached to a shaft;
said shaft is a cylinder with the blade bit attached to a first end of the cylinder and a punch device attached to a second end of the cylinder;
said punch device includes a tubular sleeve and a rod sliding within the tubular sleeve; and
said rod on the punch device is hollow for air to escape.

* * * * *